United States Patent [19]

Abel

[11] 3,957,568

[45] May 18, 1976

[54] CUTTER FOR NON-WOVEN CARPET MACHINE

[75] Inventor: Martin L. Abel, Franklin, Mich.

[73] Assignee: Permalock Company, Inc., Auburn Heights, Mich.

[22] Filed: Dec. 18, 1973

[21] Appl. No.: 425,890

[52] U.S. Cl. ........................................ 156/510; 83/4; 83/174; 156/254; 156/269; 156/271; 156/498

[51] Int. Cl.$^2$ ........................ B26D 1/48; B26D 1/54; B32B 31/18

[58] Field of Search ............. 156/72, 250, 254, 269, 156/271, 523, 530, 498, 510, 522; 83/4, 174

[56] References Cited

UNITED STATES PATENTS

| | | | |
|---|---|---|---|
| 3,263,537 | 8/1966 | Rehman et al. | 83/4 |
| 3,395,595 | 8/1968 | Braun et al. | 83/174 |
| 3,530,908 | 9/1970 | Crow | 83/4 |
| 3,736,820 | 6/1973 | Jung | 83/4 |
| 3,816,204 | 6/1974 | Nagayoshi | 156/72 |

FOREIGN PATENTS OR APPLICATIONS

| | | | |
|---|---|---|---|
| 766,935 | 9/1967 | Canada | 83/4 |

*Primary Examiner*—Caleb Weston
*Attorney, Agent, or Firm*—Lane, Aitken, Dunner & Ziems

[57] ABSTRACT

A cutter for a non-woven carpet machine in the form of a continuous belt or band which is tensioned and moves continuously in one direction against advancing yarn strands. A sharpening mechanism can be provided to sharpen the blade while it is moving and without stopping the carpet making machine by moving the blade against the sharpening mechanism. A cooling unit can be provided for circulating cooling air against the carpet backing layers to harden adhesive in which the yarn is embedded.

6 Claims, 6 Drawing Figures

F/G. 5.
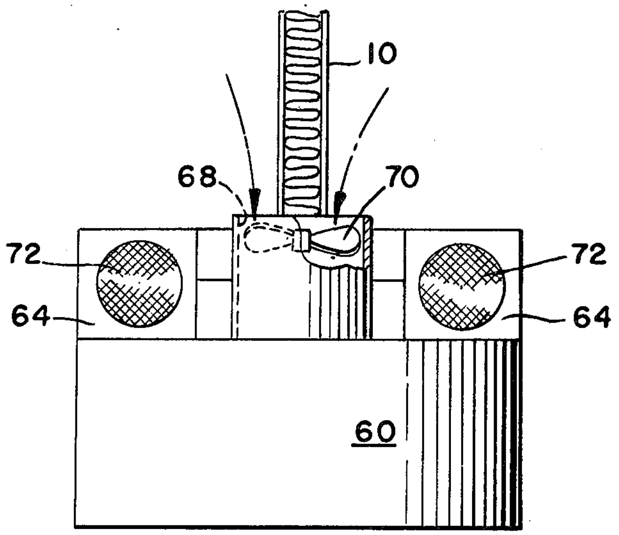
F/G. 6.
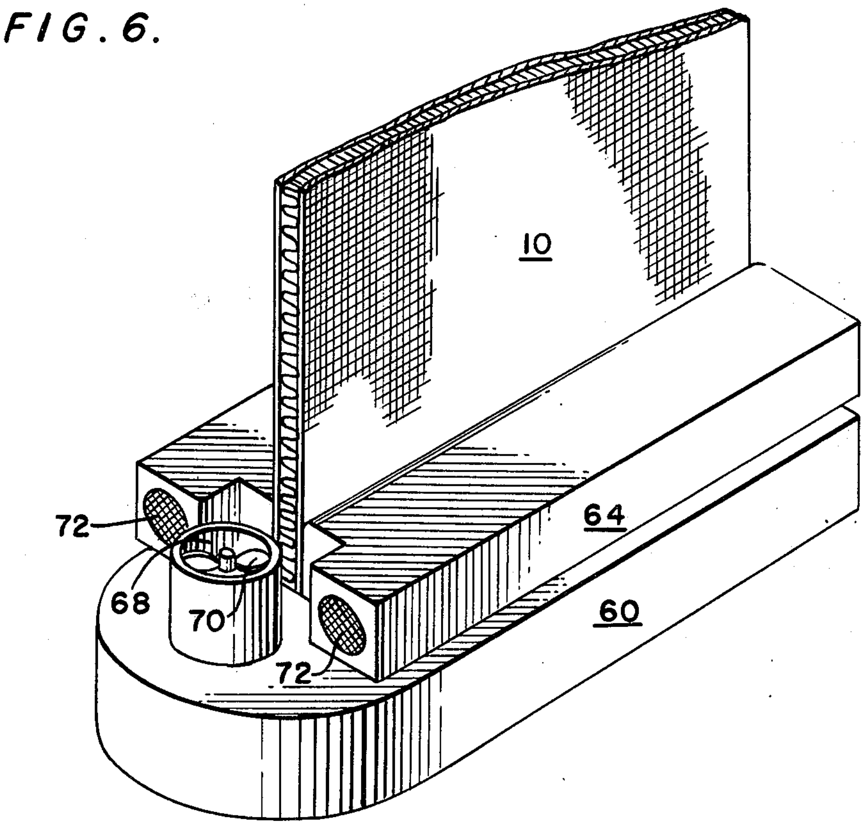

CUTTER FOR NON-WOVEN CARPET MACHINE

BACKGROUND OF THE INVENTION

This invention relates to machines for making non-woven bonded carpeting by forming a plurality of accordion-like chains of yarn between two backing layers and then severing the yarn between the layers to form two carpets and, more particularly, to the portion of such a machine that cuts or severs the yarn.

Machines have been developed for making carpeting by folding a number of strands of yarn in a row simultaneously and planting them in a layer of adhesive spread across the surface of a sheet of backing material, and then repeating the operation on an opposing parallel sheet of backing material. This is done to form a series of accordion-type loops from each strand of yarn so that a plurality of lengths of material are bonded between the backing layers. After the adhesive has been cured, the loops are severed midway between the backing layers to form two separate carpets. Alternatively, individual lengths of yarn can be severed and one end planted in an adhesive coating on one backing layer and then another backing layer can be applied later to the other ends. Another type of machine has been developed in which the loops of yarn are formed initially without bonding them to the backing layers, and adhesive is applied later to the yarn.

In these types of operations, the adhesive can be used as the backing layer in addition to being the means for anchoring the yarn in place.

When a backing material is used, it is normally formed of woven strands of jute, although there are many other suitable types of backing material. The bonding material can be an adhesive such as a liquid synthetic resin which has been applied to the backing sheets or directly to the yarn. Polyvinylchloride (PVC) has been found to be effective.

After the strands of yarn are bonded to the parallel backing layers to form what is known as a yarn "sandwich," the strands of yarn must be severed at some point between the two backing layers to form the carpets. Different types of cutting mechanisms have been used in prior art machines but they have proved to be less than satisfactory. Most of these mechanisms are designed and operate in such a way that the speed at which the machine can operate is limited. Other cutters are not capable of cutting a precisely straight path across the entire width of the sandwich, which can be upward of twenty feet.

I have developed a cutter which effectively solves the above problems, which is the subject of my U.S. Pat. application No. 315,845, filed Dec. 18, 1972, now abandoned. This cutter comprises two or more blades which moves back and forth across the advancing yarn strands, each blade cutting less than the full carpet width. However, I have found that cutters which move with this back and forth action to sever the strands from side-to-side cause a "J-cut;" that is, one point on each severed yarn end sticks up higher than the rest of the end. In order to produce acceptable commercial carpeting, an additional trimming step is then required to flatten the yarn ends, which adds significantly to the cost of the carpets through additional time and equipment and wasted yarn.

Another drawback of that cutter described in my application mentioned above is that although it is significantly faster than known prior art cutters, it is still too slow for optimum operation in conjunction with the faster yarn folding mechanisms that are being developed, such as the one shown and described in my U.S. Pat. application Ser. No. 323,440, filed Jan. 15, 1973, U.S. Pat. No. 3,915,789. In addition, because of the non-continuous back and forth movement of that cutter parts tend to wear out relatively fast and a complicated and bulky moving mechanism is required which is expensive to manufacture and maintain.

SUMMARY OF THE INVENTION

In accordance with the invention, a unique cutter for non-woven carpet machines is provided which solves the problems discussed above.

The cutter is in the form of a continuous belt or band of hardened steel which moves continuously in one direction against the advancing yarn strands. The cutter severs the strands against their direction of movement instead of from side-to-side so that the J-cut mentioned above is eliminated.

The belt can be placed under high tension so that no auxiliary guides are needed in order to maintain the cutting edge in a straight line across the entire width of the carpet sandwich. Alternatively, if greater blade life is desired, the tension can be reduced and guides provided.

A sharpening mechanism can be used for sharpening the blade without stopping the carpet making machine. This can be done by providing a pair of cooperating grinding wheels and a raising mechanism for the belt. These can be activated either manually or by a timing mechanism to raise the belt against the grinding wheels to sharpen the cutting edge when needed.

A cooling unit circulates cooling air against the outer faces of the sandwich after it emerges from the curing oven and before cutting takes place. The cooling air makes sure that the bonding material is cured sufficiently before the cutting step so that the yarn strands are anchored securely in place. In this way, any frictional pull caused by the cutter will not pull the yarn out of the bonding material. In addition, the cooling unit can be located directly above the cutter, which results in dissipation of any frictional heat caused by the cutter blade moving across the yarn and resulting in a cooler blade because the carpeting is cooled so that the blade does not engage hot material.

BRIEF DESCRIPTION OF THE DRAWINGS

For a better understanding of the invention, reference may be had to the following description of an exemplary embodiment taken in conjunction with the accompanying drawings in which:

FIG. 5 is a front plan view partially in section of the cooling unit; and

FIG. 6 is a perspective view of the cooling unit.

DETAILED DESCRIPTION OF AN EXEMPLARY EMBODIMENT

Figure 1:
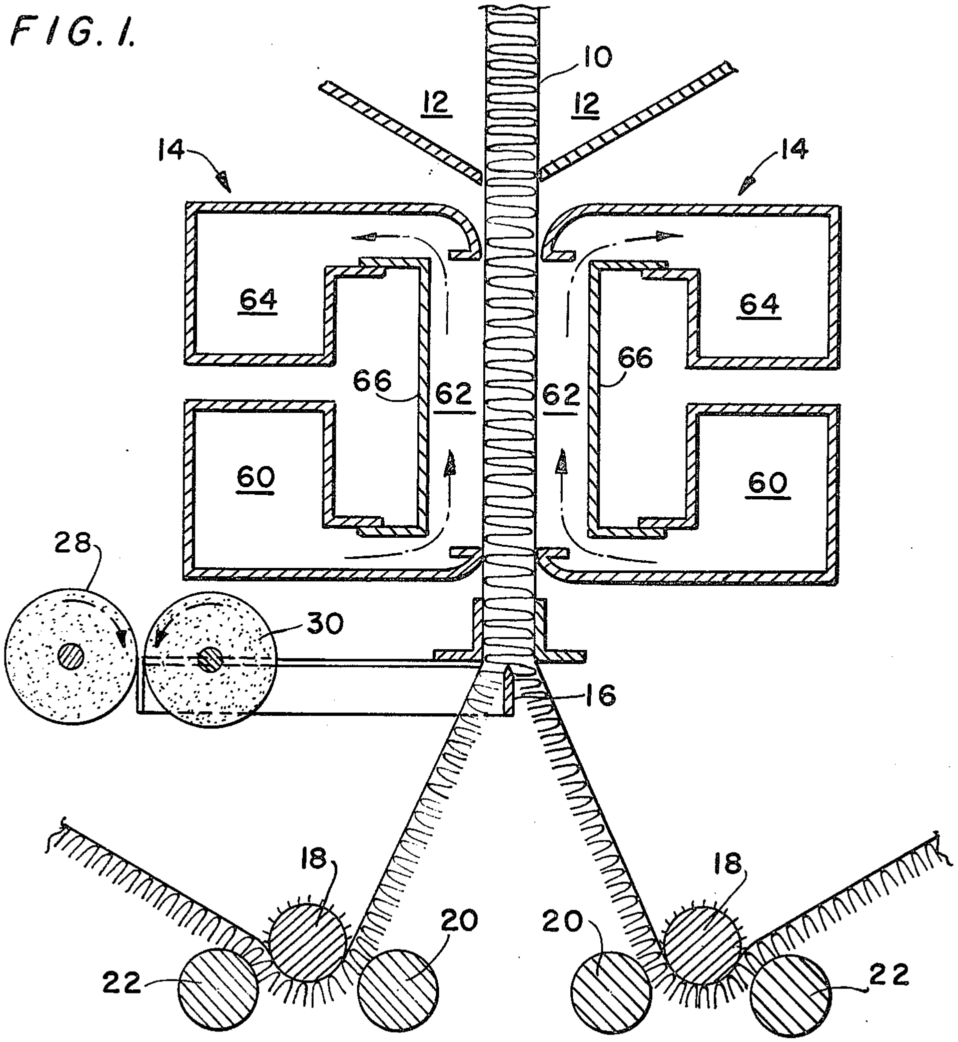
FIG. 1 is a front view in section of the cutter and cooling unit that shows their location relative to the advancing yarn sandwich.

Now, referring to the drawings, an exemplary embodiment of the invention will be described in detail. FIG. 1 shows the portion of the machine where the yarn sandwich 10 emerges from the oven 12 and enters the cooling unit which is generally designated by reference numeral 14. After the sandwich 10 passes through the cooling unit 14 it is severed by the cutting blade 16 to form two separate carpets that are then wound onto rollers (not shown). The invention will be described with PVC as the bonding material, but it should be understood that other suitable bonding materials fall within the scope of the invention.

The backing layer and yarn coveying and advancing mechanisms, PVC applicating unit, yarn folding mechanism and oven details are not shown in this application. However, such items suitable for use with the invention described in detail below are described in my copending U.S. Pat. applications Ser. No. 315,845, filed Dec. 18, 1972, and Ser. No. 323,440, filed Jan. 15, 1973. It must be kept in mind, though, that other mechanisms suitable for forming such a yarn sandwich can also be used with this invention.

Figure 2:
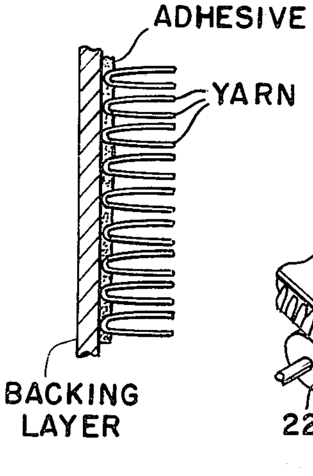
FIG. 2 is an exaggerated view that shows the yarn embedded in bonding material that is coated on a backing layer.

Generally, non-woven bonded carpeting machines make carpeting by advancing two layers of backing material, preferably jute, toward a well and coating one surface of each backing layer with PVC. The coated layers are then advanced into a well so that they are parallel and face each other, and then a plurality of strands of yarn are planted alternately in the PVC on one backing layer and then in the PVC on the other layer. In this way a plurality of accordion-type strands are formed between the backing layers to form the yarn sandwich 10. The sandwich is continuously advanced through the well and into an oven where heat is applied to cure the PVC. An exaggerated view of the yarn, PVC and backing material is shown in FIG. 2. The other figures do not show this detail for ease of understanding.

After the PVC has been heated sufficiently in the oven 12, the sandwich 10 enters the cooling unit 14 where air is circulated against the outer face of each backing layer to cool the PVC so that it hardens sufficiently to anchor the yarn firmly in place and to cool the sandwich 10. This prevents the yarn from pulling out of the PVC due to frictional pull during the cutting step. In addition, the cooling air will dissipate any frictional heat which may be generated by the cutting blade moving across the strands of yarn and because the sandwich is cooled will insure that the blade will not become too hot by moving across hot material.

The sandwich 10 is advanced by means of the drive roller 18 and compression rollers 20 and 22 on both sides of the machine, which operate to pull the sandwich down through the well of the machine. The rollers 20, 22, are covered with a rubber material known as "Rough-top Belting" so that they can grip the carpet without the need for too much pressure and the roller 18 is equipped a plurality of pins which engage the backing layer. In this way, the sandwich 10 can be advanced at a constant rate of speed so that a uniformly cut product can be made.

Figure 3:
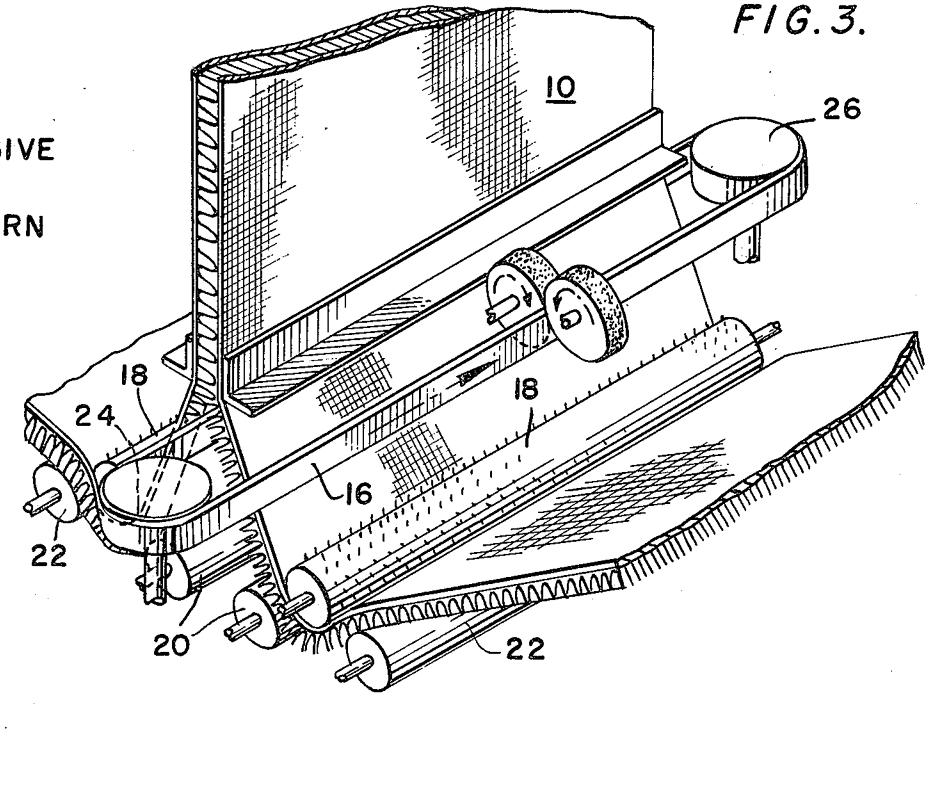
FIG. 3 is a perspective view that shows the cutter in relation to the advancing sandwich, with portions of the machine being eliminated for ease of understanding.

The cutting blade 16 is an endless belt formed of hardened steel that extends across the entire face of the sandwich 10. As shown in FIG. 3, the belt is tensioned between two wheels 24, 26, the former being the drive wheel and the latter the idler. The drive wheel 24 is driven by known drive means and is securely mounted on the frame of the machine. The idler wheel is mounted in such a manner that the tension exerted by the wheels on the belt can be adjusted by moving the idler wheel relative to the drive wheel. The tension can be adjusted to above 300 pounds of pull so that the steel band is maintained straight enough without guides to provide a high quality cut. Alternatively, the tension can be lowered to between 200–300 pounds of pull and guides provided to keep the blade straight, which results in longer blade life. Preferably, the wheels 24, 26, are about 30 inches in diameter and the drive wheel 24 moves at about 350 revolutions per minute. The speed of the belt can be increased but this would result in shorter belt life. However, the higher speed may be desirable in some cases. In addition, the wheels 24, 26, can be made adjustable in the horizontal plane between the backing layers perpendicular to the direction of movement of the blade so that the relative height of the pile of the two carpets can be regulated.

Figure 4:
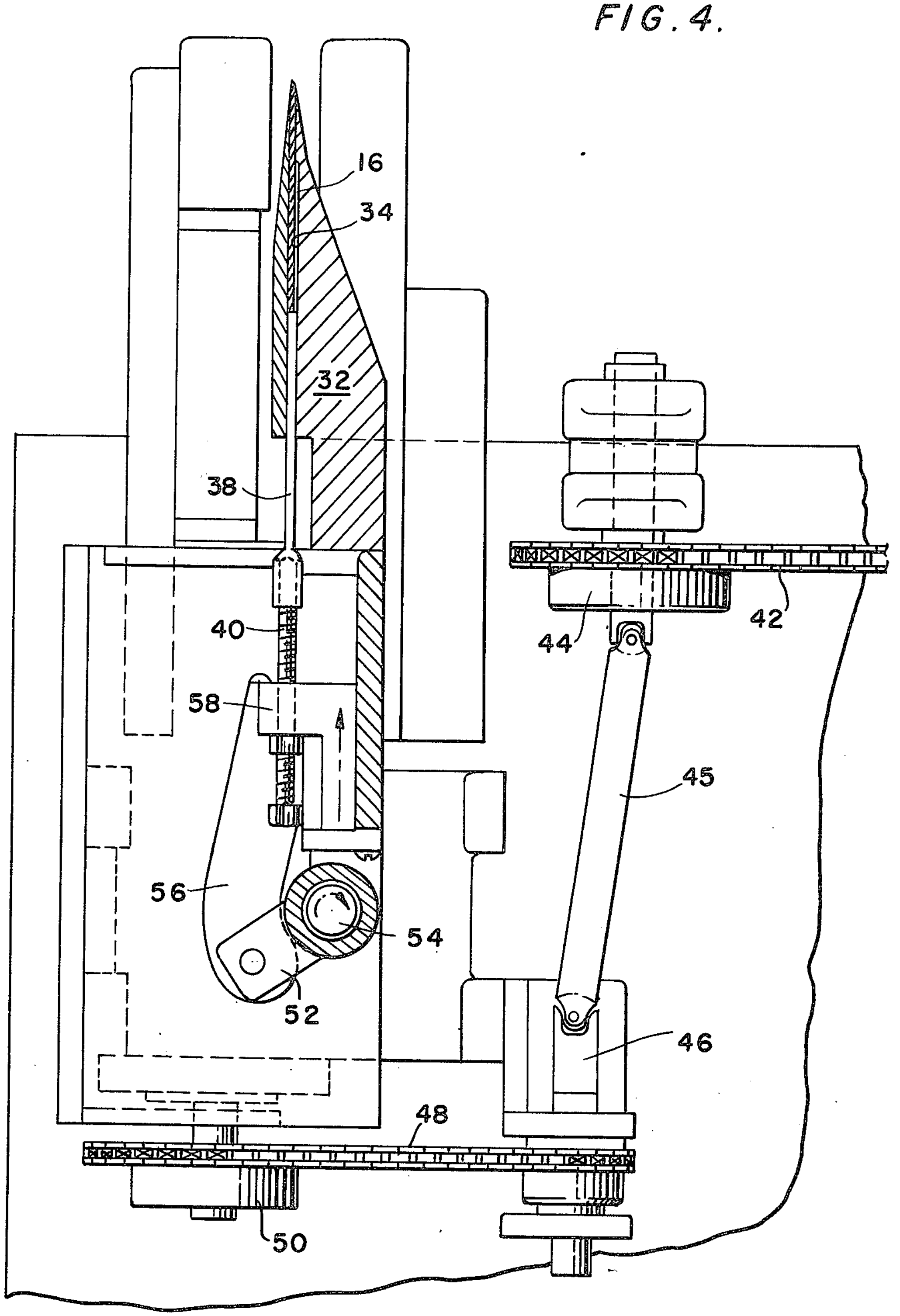
FIG. 4 is a side view partially in section of the cutter guide and lifting mechanism.

As shown in FIGS. 1 and 4, a pair of cooperating grindwheels 28, 30, can be provided to sharpen the blade 16 without stopping the carpet making machine. They are driven by known means. The grinding wheels 28, 30, are operated in conjunction with a raising mechanism such as the one shown in FIG. 5. Whenever such a raising mechanism is used a guide 32 can be provided for the portion of the blade 16 where the cutting takes place and to extend across the entire width of the sandwich 10, the blade 16 moving through the groove 34 located in the guide 32. If such a guide is used, the blade tension can be lowered to prolong belt life, the guide operating to keep the cutting blade 16 straight.

When such a guide is provided, the height of the blade can be maintained constant by means of the bottom surface of the groove through which the blade moves. When no guide is used and the blade is under high tension between the wheels 24, 26, flanges can be provided on the outer edges of one or both wheels for maintaining the blade at a constant height.

The raising mechanism operates in conjunction with the guide 32 and can be activated automatically such as for example by a timing device or it can be operated manually. When the grinding wheels start turning in the direction of the arrows shown in FIGS. 1 and 4, the raising mechanism is used to raise the cutting blade 16 against the grinding wheels until a sufficiently sharp cutting edge is provided.

In the sectional view of the raising mechanism shown in FIG. 5, the cutting blade 16 is disposed in the groove 34 of the guide 32. The bottommost edge of the blade 16 moves along and engages a plurality of carbide inserts 36 which maintain the blade at the desired height. Since carbide is harder than the steel blade, the blade will wear faster than the inserts. However, the wear on each is considered to be relatively nominal. The guide is formed of steel hardened to a greater degree than the belt and should last for the life of the machine.

The raising of these carbide inserts 36 raises the blade 16. The inserts are spaced at about 1 foot apart along the length of the blade. The bottom edge of each insert 36 rests on a raising element 38 which is attached to the screw 40.

When the raising mechanism is in operation a motor (not shown) drives the chain 42 that operates to turn the wheel 44, the universal section 45 and the member 46. This in turn drives the chain 48 which turns the wheel 50 which through a gear mechanism (not shown) raises a plurality of arms 52 that are keyed to the shaft 54 that extends across the width of the yarn sandwich. One end of the raising member 56 is attached to the arm 52 and the other end to the bracket 58 which engages and holds the screw 40. Thus, when the shaft 54 turns, each arm 52 will operate to raise its respective screw 40 which by raising the member 38 raises the carbide inserts 36 and the cutter blade 16. In this way, an accurate and uniform raising along the entire length of the cutter can be accomplished.

At the same time that the blade is being raised the grinding wheels 28, 30, are rotating to sharpen the edge of the blade. A manual adjustment is provided (not shown) for raising the blade at a much faster rate than is done when the automatic controls are used. A photoelectric eye (not shown) can be provided both above and below the cutting blade 16 to act as an emergency cut-off for the machine in case the blade is raised or lowered beyond predetermined limits.

If such a guide as just described is used, whenever the blade 16 wears out it must be replaced by releasing tension on the blade and cutting it with a torch. One end of the new blade is welded to an end of the old blade which is then used to pull the new blade through the guide. After this is done the two ends of the new blade are butt-welded together, the weld ground down and tension reapplied.

The cooling unit 14 is positioned directly above the cutter so that the PVC can be cooled and hardened sufficiently to prevent the yarn from pulling out during the cutting process and to reduce any frictional heat which may result when the cutter blade 16 moves across the yarn. This cooling unit can simply be used to supply a stream of air against the outer face of the backing layers, or it can be hooked up to an air-conditioning unit to provide air at temperatures below ambient, depending on the heat level in the factory and oven and on the type of adhesive that is used.

As shown in FIG. 1, the cooling unit 14 has a cool air chamber 60, a circulating chamber 62 adjacent to the outer face of the backing layers and an exhaust chamber 64 where the air is received after it is circulated past the backing layers. The air moves in the direction of the arrows shown in FIG. 1. The wall 66 is adjustable back and forth to regulate the width of the passageway through which the air travels along the face of the backing layers.

As shown in FIG. 6, air is introduced into the unit 14 through the intake opening 68 and then transmitted along the cool air chamber 60 which extends across the entire width of the sandwich 10. The air enters in the direction of the arrows as shown in FIG. 5. A fan 70, such as the one shown in FIG. 7, can be used. After the air is circulated across the outer face of the backing layers, it flows into the exhaust chambers 64 which also extend across the entire width of the sandwich 10 and out through the exhaust openings 72.

Thus, there is provided a continuous band cutter for non-woven carpet making machines which enables the machine to make carpet at a higher rate of speed than previously feasible. The cutting blade 16 described above provides for a continuous method of cutting carpet which only needs to be shut down when a new blade is required. The blade 16 is self-sharpening and can be made completely automatic in operation so that no manual operations are necessary. Since the blade runs straight across the face of the strands of yarn and cuts them not from the side but in the direction of movement, no J-cuts result, which eliminates the need for any subsequent trimming operations.

In addition, because of the accurate aligning that is possible by either placing the blade under high tension or using a guide a constantly uniform product can be made. A cooling unit can be provided to make sure the yarn is anchored securely in the PVC and to reduce any heat between the blade and yarn due to friction or the high temperature of the material as it emerges from the oven. A soft bond at this point could cause the yarn to "roll out" of the bonding material if the sandwich is not cooled and the bonding material hardened. Cutting in the direction of yarn movement is advantageous because to cut from the side causes a greater tendency for the yarn to "roll out."

The embodiment of the invention described above is intended to merely be exemplary and those skilled in the art will no doubt be able to make modifications and variations without departing from the spirit and scope of the appended claims. All such modifications and variations are contemplated as falling within the scope of the claims.

I claim:

1. A machine for making non-woven bonded carpet, comprising bonding means for bonding a plurality of lengths of material between opposing backing layers, a cutting mechanism comprising an endless cutting blade vertically disposed with a cutting edge along the top edge thereof, moving means for moving the blade continuously in one direction longitudinally, advancing means for advancing the lengths of material and backing layers vertically toward the blade, the blade being located so that a substantial length of the blade moves across the path along which the lengths of material are advanced to sever said lengths of material and form two lengths of carpet, guide means for guiding the blade in substantially a straight line across the entire width of said path, said guide means including a groove adapted to receive and guide the blade, and support means for supporting the blade, the support means including a plurality of spaced apart surfaces in the groove for engaging and supporting the side of the blade opposite the cutting edge.

2. The machine in claim 1, wherein the surfaces include a plurality of carbide inserts.

3. The improvement in claim 1, further including means for sharpening the cutting edge of the blade positioned along a portion of the length of the blade outside of said path.

4. The machine in claim 3, wherein the means for sharpening includes a pair of cooperating grinding wheels located on opposite sides of the blade.

5. The machine in claim 3, further including means for selectively moving the blade against the means for sharpening.

6. The machine in claim 5 wherein the means for selectively moving includes means for raising the spaced apart surfaces for raising the blade.

* * * * *